R. F. BOWER.
ROLLER BEARING.
APPLICATION FILED AUG. 11, 1915.

1,170,733.

Patented Feb. 8, 1916.

Inventor
Robert F. Bower

By Whittemore Hulbert & Whittemore
Attorney

UNITED STATES PATENT OFFICE.

ROBERT F. BOWER, OF DETROIT, MICHIGAN, ASSIGNOR TO BOWER ROLLER BEARING COMPANY, OF DETROIT, MICHIGAN, A CORPORATION OF MICHIGAN.

ROLLER-BEARING.

1,170,733.  Specification of Letters Patent. Patented Feb. 8, 1916.

Application filed August 11, 1915. Serial No. 44,932.

*To all whom it may concern:*

Be it known that I, ROBERT F. BOWER, a citizen of the United States of America, residing at Detroit, in the county of Wayne and State of Michigan, have invented certain new and useful Improvements in Roller-Bearings, of which the following is a specification, reference being had therein to the accompanying drawings.

The invention relates to roller bearings designed to sustain end thrust as well as radial thrust, and of the type in which there is a cylindrical body portion with an enlargement at one end only thereof.

It is the object of the invention, first, to obtain a construction which will take care of end thrust in opposite directions without any detriment to the radial thrust bearing; second, to provide a simple and inexpensive means of converting a single end thrust bearing into a double end thrust bearing; third, to facilitate the assembly of the parts; and fourth, to obtain a simple and compact construction which is easily manufactured and is serviceable in operation.

Figure 1:
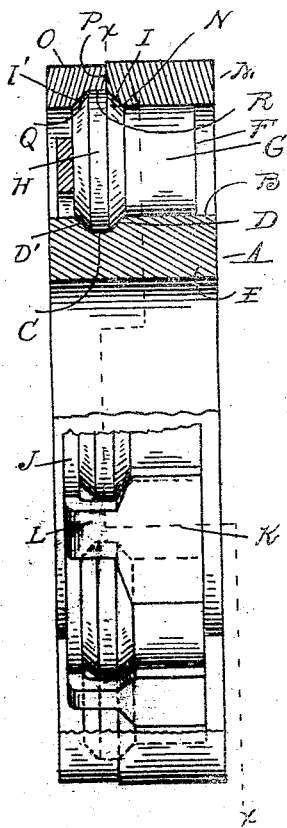
Figure 2:
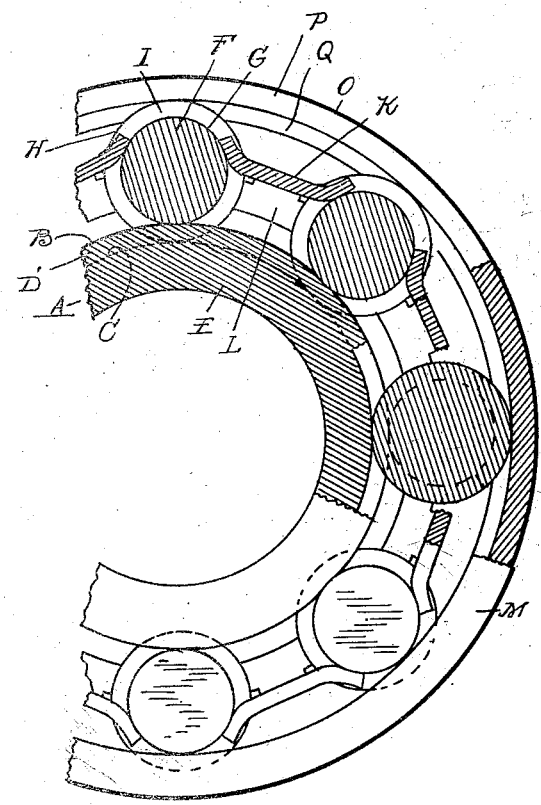

In the drawings: Figure 1 is a sectional edge elevation of the bearing; and Fig. 2 is a section on line $x$—$x$ Fig. 1.

My construction is an improvement in that type of bearing in which the rollers are comparatively short and provided with enlarged heads at one end only, which heads have oppositely angling beveled faces forming a V-shaped section. The rollers engage annular inner and outer race members which are grooved to receive the enlarged heads and are provided with complementary beveled faces for taking the end thrust. There is also provided a suitable cage or spacer for the rolls. With this type of bearing the differential speed of the cylindrical portion and enlarged head portions of the rolls is not detrimental, for the reason that the same rolls are not usually under both radial thrust and end thrust at the same time. Also the tendency of the roll to skew which is present where the opposed end thrust surfaces are at opposite ends of the roll, is avoided in this construction by arranging said opposed surfaces in approximately the same plane,—that is, the thickness of the head is slight in comparison with the diameter of the roll. As a consequence bearings of this type will stand up under severe usage where subjected to both radial and end thrust, and the wear in both the rolls and the race members is comparatively slight. Heretofore bearings of this type, which are capable of sustaining end thrust in one direction, have been extensively used, such construction being shown in my prior Patent No. 1,070,664. As shown in this prior patent, the inner race member is grooved to receive the enlarged heads of the rolls and to form the end thrust surface for the outer face of the roll head. The outer race member is, however, merely provided with a beveled face at its end to engage the inner beveled face of the roll head, and thus the parts may be readily assembled. The present construction is designed to take end thrust in opposite directions, which necessitates grooves in both the outer and the inner race members, and consequently the problem arises as to how to assemble the parts, for the diameter of the heads of the rolls is greater than the space between the inner and outer race members. This problem I have solved by dividing one of the race members in the plane of the groove, so that the portions upon opposite sides of the dividing plane may be assembled from opposite sides of the rolls. A further advantage of this construction is that it permits the use of the standard single end thrust bearing, such as shown in my former patent, in the construction of the double end thrust bearing, it being merely necessary to add another section to the outer race member. Thus any single end thrust bearing may be changed into a double end thrust bearing by the addition of this one part, or on the contrary, a double end thrust bearing may be converted into a single end thrust by the removal of this part, which is a great convenience in manufacturing where both kinds of bearings are used.

As shown, A is the inner race member, which is provided on its outer face with a cylindrical portion B, a groove C and beveled faces D and D' on opposite sides of said groove. These beveled faces are held in fixed relation to each other by the integral connecting portion E at the bottom of the groove.

F are the rollers, each of which is provided with a cylindrical portion G for engaging the cylindrical portion B of the race member, and the enlarged head H, having beveled faces I and I' for respectively engaging the beveled faces D and D' of the race member. The rolls G are held in properly spaced relation to each other and in engagement with the race member by means of a suitable cage or spacer. This, as shown, comprises a stamped sheet metal construction including a flat ring J which bears against the heads of the rolls in between the outer and inner race members, and bent lugs K integral with said ring, which extend between adjacent rolls to space the same and retain them in engagement with the race member. The parts are assembled by first engaging the rolls with the race member and then opening the lugs of the cage, said lugs having reduced neck portions L which provide clearance for the enlarged heads of the rolls.

The construction as thus far described constitutes an assembly which may be readily engaged with the outer race member M of a single end thrust bearing. When thus engaged the thrust is transmitted from the outer beveled face D' of the race member A to the outer beveled faces I' of the rolls, and from the inner beveled faces I of said rolls to the beveled face N on the outer race member M, this being the construction shown in my former patent. To convert this construction into a double end thrust bearing I have added a member O which has an inner face P abutting against the outer face of the member M, also a beveled face Q which transmits the end thrust to the beveled faces I' of the rolls, and is opposed to the end thrust transmitted from the beveled face D of the inner race member to the bevel I of the rolls. The member O is preferably further provided with a cylindrical portion R between the beveled portion Q and the end face P, which provides the necessary clearance for the heads of the rolls without reducing the area of contact of the face P.

As the members M and O are separate from each other and are separately fashioned, it is obvious that extreme accuracy in workmanship is required to make these members exactly complementary to each other. I have therefore avoided the necessity of such accuracy by slightly reducing the diameter of the outer face of the member O, so that it is less than the diameter of the member M and will provide clearance in a socket which exactly fits the member M. This is permissible as the only function of the ring O is to receive end thrust, and the radial clearance thus provided will permit said member O to find its seat. Thus, even where there is a slight eccentricity in the beveled face Q in relation to the outer face of the member O, this will produce no binding effect.

The construction as described is one which can be manufactured at small cost, and as above stated, the only part required in addition to the elements of the single end thrust bearing is the member O.

What I claim as my invention is:—

In a roller bearing, the combination with a single end thrust assembly, comprising a series of rolls each having a cylindrical portion and an enlarged head at one end with opposed end thrust faces, an inner annular race member having a cylindrical face with which the cylindrical portions of said rolls engage and a groove having oppositely-beveled faces, an outer race member having a cylindrical portion for engaging the cylindrical portions of said rolls and a beveled end for engaging the inner beveled faces of said rolls, of an additional race member abutting against the end of said outer race member and forming a groove for the heads of the rolls, with an oppositely-beveled face, said additional race member converting said single end thrust assembly into a double end thrust bearing, and being of slightly lesser diameter than the outer race member of said single end thrust bearing to find an independent seat.

In testimony whereof I affix my signature in presence of two witnesses.

ROBERT F. BOWER.

Witnesses:
JAMES P. BARRY,
H. E. BOWMAN.